(12) United States Patent
Addink et al.

(10) Patent No.: US 7,048,204 B1
(45) Date of Patent: May 23, 2006

(54) IRRIGATION CONTROLLER USING ESTIMATED SOLAR RADIATION

(75) Inventors: John W. Addink, Riverside, CA (US); Sylvan Addink, Riverside, CA (US)

(73) Assignee: Aqua Conserve, Inc., Riverside, CA (US)

( * ) Notice: Subject to any disclaimer, the term of this patent is extended or adjusted under 35 U.S.C. 154(b) by 66 days.

(21) Appl. No.: 10/416,056

(22) PCT Filed: Nov. 6, 2000

(86) PCT No.: PCT/US00/41944

§ 371 (c)(1),
(2), (4) Date: Jun. 14, 2004

(87) PCT Pub. No.: WO02/38284

PCT Pub. Date: May 16, 2002

(51) Int. Cl.
*A01G 27/00* (2006.01)
*G05D 7/00* (2006.01)
*F16K 17/36* (2006.01)

(52) U.S. Cl. ............... 239/63; 239/69; 239/71; 137/78.2; 137/78.3; 700/284

(58) Field of Classification Search ............... 239/63, 239/64, 65, 67, 69, 71; 137/78.2, 78.3; 700/284
See application file for complete search history.

(56) References Cited

U.S. PATENT DOCUMENTS

| | | | |
|---|---|---|---|
| 4,992,942 A * | 2/1991 | Bauerle et al. | ............ 700/284 |
| 5,023,787 A | 6/1991 | Evelyn-Veere | |
| 5,097,861 A | 3/1992 | Hopkins et al. | |
| 5,208,855 A | 5/1993 | Marian | |
| 5,229,937 A | 7/1993 | Evelyn-Veere | |
| 5,479,339 A | 12/1995 | Miller | |
| 5,696,671 A | 12/1997 | Oliver | |
| 5,870,302 A | 2/1999 | Oliver | |
| 6,102,061 A | 8/2000 | Addink | |
| 6,314,340 B1 * | 11/2001 | Mecham et al. | ............ 700/284 |

FOREIGN PATENT DOCUMENTS

WO    WO 02/05045 A1    1/2002

\* cited by examiner

*Primary Examiner*—David A. Scherbel
*Assistant Examiner*—Seth Barney
(74) *Attorney, Agent, or Firm*—Rutan & Tucker, LLP

(57) ABSTRACT

An irrigation controller (200) receives temperature data, and at least partly derives an estimated solar radiation value from the temperature data. A regression model stored in a memory (220) of the irrigation controller (200) operates upon a data point from the estimated solar radiation to estimate an evapotranspiration rate, which is used to affect an irrigation schedule executed by the controller (200). The regression model is preferably based upon a comparison of historical ETo values against corresponding historical environmental values, with the data advantageously spanning a time period of at least two days, and more preferably at least one month. Data from one or more environmental factors may also be used, including especially estimated solar radiation, temperature, wind speed, humidity, and soil moisture, and so forth. Values relating the environmental factor(s) may enter the controller from a local sensor (240), a distal signal source, or both.

16 Claims, 6 Drawing Sheets

IRRIGATION CONTROLLER USING ESTIMATED SOLAR RADIATION

FIELD OF THE INVENTION

The field of the invention is irrigation controllers.

BACKGROUND OF THE INVENTION

Many irrigation controllers have been developed for automatically controlling application of water to landscapes. Known irrigation controllers range from simple devices that control watering times based upon fixed schedules, to sophisticated devices that vary the watering schedules according to local geographic and climatic conditions.

With respect to the simpler types of irrigation controllers, a homeowner typically sets a watering schedule that involves specific run times and days for each of a plurality of stations, and the controller executes the same schedule regardless of the season or weather conditions. From time to time the homeowner may manually adjust the watering schedule, but such adjustments are usually only made a few times during the year, and are based upon the homeowner's perceptions rather than the actual watering needs. One change is often made in the late Spring when a portion of the yard becomes brown due to a lack of water. Another change is often made in the late Fall when the homeowner assumes that the vegetation does not require as much watering. These changes to the watering schedule are typically insufficient to achieve efficient watering.

More sophisticated irrigation controllers usually include some mechanism for automatically making adjustments to the irrigation run times to account for daily environmental variations. One common adjustment is based on soil moisture. It is common, for example, to place sensors locally in the soil, and suspend irrigation as long as the sensor detects moisture above a given threshold. Controllers of this type help to reduce over irrigating, but placement of the sensors is critical to successful operation.

More sophisticated irrigation controllers use evapotranspiration rates for determining the amount of water to be applied to a landscape. Evapotranspiration is the water lost by direct evaporation from the soil and plant and by transpiration from the plant surface. Potential evapotranspiration (ETo) can be calculated from meteorological data collected on-site, or from a similar site. One such system is discussed in U.S. Pat. No. 5,479,339 issued December, 1995, to Miller. Due to cost, most of the data for ETo calculations is gathered from off-site locations that are frequently operated by government agencies. Irrigation systems that use ETo data gathered from off-site locations are discussed in U.S. Pat. No. 5,023,787 issued June, 1991, and U.S. Pat. No. 5,229,937 issued July, 1993 both to Evelyn-Veere, U.S. Pat. No. 5,208,855, issued May, 1993, to Marian, U.S. Pat. No. 5,696,671, issued December, 1997, and U.S. Pat. No. 5,870,302, issued February, 1999, both to Oliver, U.S. Pat. No. 5,097,861 issued March 1992 to Hopkins, et al., and U.S. Pat. No. 6,102,061, issued August, 2000 to Addink. These and all other referenced patents are incorporated by reference herein.

Due to cost and/or complicated operating requirements very few of these efficient irrigation controllers, discussed in the previous paragraph, are presently being installed on residential and small commercial landscape sites. Therefore, controllers that provide only inadequate schedule modification are primarily used to irrigate most residential and small commercial landscape sites. This results in either too much or too little water being applied to the landscape, which in turn results in both inefficient use of water and unnecessary stress on the plants. Therefore, a need existed for a cost-effective irrigation system for residential and small commercial landscape sites that is capable of frequently varying the irrigation schedule based upon estimates of actual water requirements.

This need was met in part by a recent patent application, U.S. application Ser. No. PCT/US00/18705. The patent discusses operation of an irrigation controller comprising: a memory that stores a regression model; a microprocessor that applies a value for an environmental factor to the regression model to estimate an evapotranspiration rate (estimated ETo); and a mechanism that uses the estimated ETo to affect an irrigation schedule executed by the controller. Some of the environmental factors from which the value is obtained are temperature, solar radiation, wind speed, and humidity. Although, all four meteorological factors; temperature, solar radiation, wind speed, and humidity, are typically used in a formula for calculating the actual ETo, temperature and solar radiation have a greater effect on the ETo value than either wind speed or humidity. Therefore, if temperature and/or solar radiation were used for determining the estimated ETo this would provide a closer approximation to the actual ETo value than if either wind speed or humidity were used. An even closer approximation to the actual ETo value would be obtained if a combination of temperature and solar radiation were used for determining the estimated ETo. Pending patent application Ser. No. PCT/US00/18705 discusses using actual solar radiation to estimate ETo whereas the present patent uses estimated solar radiation to determine the estimated ETo Temperature data for any given installation is typically obtained using only one type of sensor. However, solar radiation data can be obtained by various solar radiation measuring devices, all of which have the commonality of an optical port through which the solar radiation passes prior to being measured by some means. There is usually a diffuser or some other cover over the optical port, which can be of any suitable material that does not unduly interfere with the solar radiation reaching the measuring means. Unfortunately, this can be problematic since the cover must be kept clean to prevent foreign material from interfering with the solar radiation reaching the measuring means.

The solar radiation data obtained and used in the determination of ETo is generally obtained from government weather stations. Maintenance is done according to a regular schedule at most or all weather stations, and the solar radiation sensor diffuser or cover is cleaned during each of the scheduled maintenance visits. However, if solar radiation were to be used at a homeowners' residence to estimate ETo for irrigation purposes, the homeowner would probably not do the necessary maintenance to keep the optical port cover clean and the solar radiation data would not be very reliable. What is required is another method for estimating solar radiation that does not require regular maintenance, and would still provide a relatively close approximation of the actual solar radiation at the irrigation site.

SUMMARY OF THE INVENTION

The present invention provides systems and methods in which an irrigation controller uses an estimated solar radiation value to affect an irrigation schedule executed by the controller. The estimated solar radiation value is partly derived from the difference between the temperature data collected from a non-shaded temperature sensor and the temperature data collected from a shaded temperature sensor.

Preferably a data point from the estimated solar radiation is applied to a regression model stored in the memory of the irrigation controller to determine the estimated ETo which is used to affect an irrigation schedule executed by the controller. The regression model can comprise a linear regression, a multiple regression, or any other type of regression.

The regression model is preferably based upon a comparison of historical ETo values against corresponding historical environmental values, with the data advantageously spanning a time period of at least two days, and more preferably at least one month. Data from multiple environmental factors may also be used.

The environmental factor(s) utilized may advantageously comprise one or more of estimated solar radiation, temperature, wind speed, humidity, and soil moisture, and so forth. Values relating the environmental factor(s) may enter the controller from a local sensor, a distal signal source, or both.

Various objects, features, aspects, and advantages of the present invention will become more apparent from the following detailed description of preferred embodiments of the invention, along with the accompanying drawings in which like numerals represent like components.

DETAILED DESCRIPTION

The estimated solar radiation, by itself, could be used to affect an irrigation schedule executed by the irrigation controller. However, a data point from the estimated solar radiation is preferably stored in the memory of the irrigation controller, and applied to a regression model. The result provides and estimated ETo, which is used to affect an irrigation schedule executed by the irrigation controller.

Figure 1:
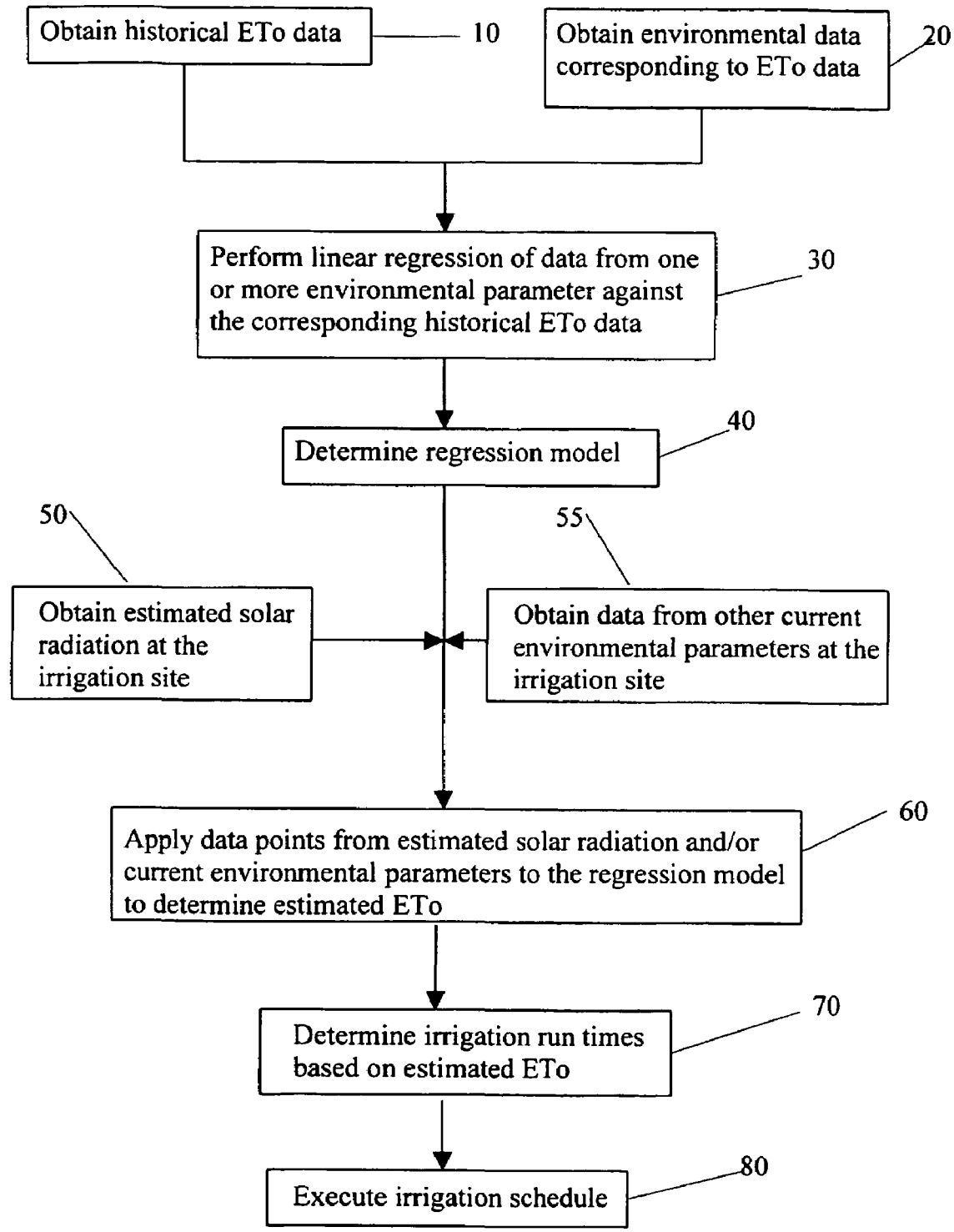
FIG. 1 is a flow chart of a preferred embodiment of the method of the present invention.

In FIG. 1 a preferred method of controlling irrigation run time generally comprises: providing historical ETo values 10; providing corresponding environmental values 20; performing a linear regression for the historical ETo values and the historical environmental values 30; determining a regression model 40; obtaining an estimated solar radiation value 50 and possibly a current local value for another environmental factor 55; applying the values to the regression model 60 to estimate current ETo 60; using the current ETo to determine the watering schedule 70; and then executing the watering schedule 80.

Instead of estimated solar radiation, the actual solar radiation at the irrigation site could be used. However, due to the need for regular maintenance of the solar radiation sensor (See Background of the Invention), it is more advantageous to use the estimated solar radiation. The estimated solar radiation is partly determined by measuring the temperature in a non-shaded area and a shaded area and, then determining the difference between these two measurements. The difference may be slightly modified by one or more factors, so it will more closely represent what the actual measurement would have been had a solar radiation sensor been used.

The historical ETo values may be obtained from a number of sources, including government managed weather stations such as CIMIS (California Irrigation Management Information System, maintained by the California Department of Water Resources), CoAgMet maintained by Colorado State University-Atmospheric Sciences, AZMET maintained by University of Arizona-Soils, Water and Environmental Science Department, New Mexico State University-Agronomy and Horticulture, and Texas A&M University-Agricultural Engineering Department. Although slight variations in the methods used to determine the ETo values do exist, most ETo calculations utilize the following environmental factors: temperature, solar radiation, wind speed and humidity.

Figure 2:
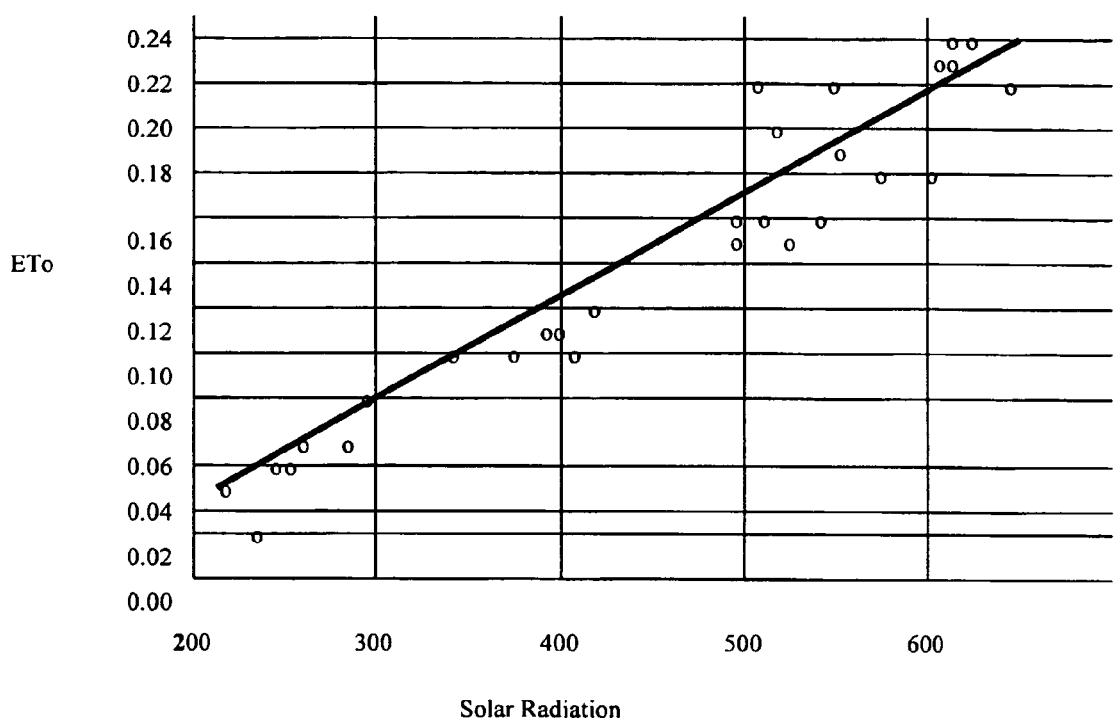
FIG. 2 is a figure showing an exemplary relationship of ETo versus solar radiation.

FIG. 2 shows an exemplary relationship of solar radiation versus ETo over a month. An increase in solar radiation generally results in an increase in the ETo value, with the opposite occurring upon a decrease in solar radiation. The other factors have greater or lesser effects than solar radiation on ETo, but all have some effect on ETo, and in addition to estimated solar radiation each of the other environmental factors can be used in the determination of a regression model.

Regression analysis can be performed on any suitable time period. Several years of data is preferred, but shorter time spans such as several months, or even a single month, can also be used. Different regression models can also be generated for different seasons during the year, for different geographic zones, and so forth.

The regression model is preferably based upon a comparison of historical ETo values against corresponding historical environmental values, with the data advantageously spanning a time period of at least two days, and more preferably at least one month. Data from multiple environmental factors may also be used.

The environmental factor(s) utilized may advantageously comprise one or more of estimated solar radiation, temperature, wind speed, humidity, and soil moisture, and so forth. Values relating the environmental factor(s) may enter the controller from a local sensor, a distal signal source, or both.

Figure 5:
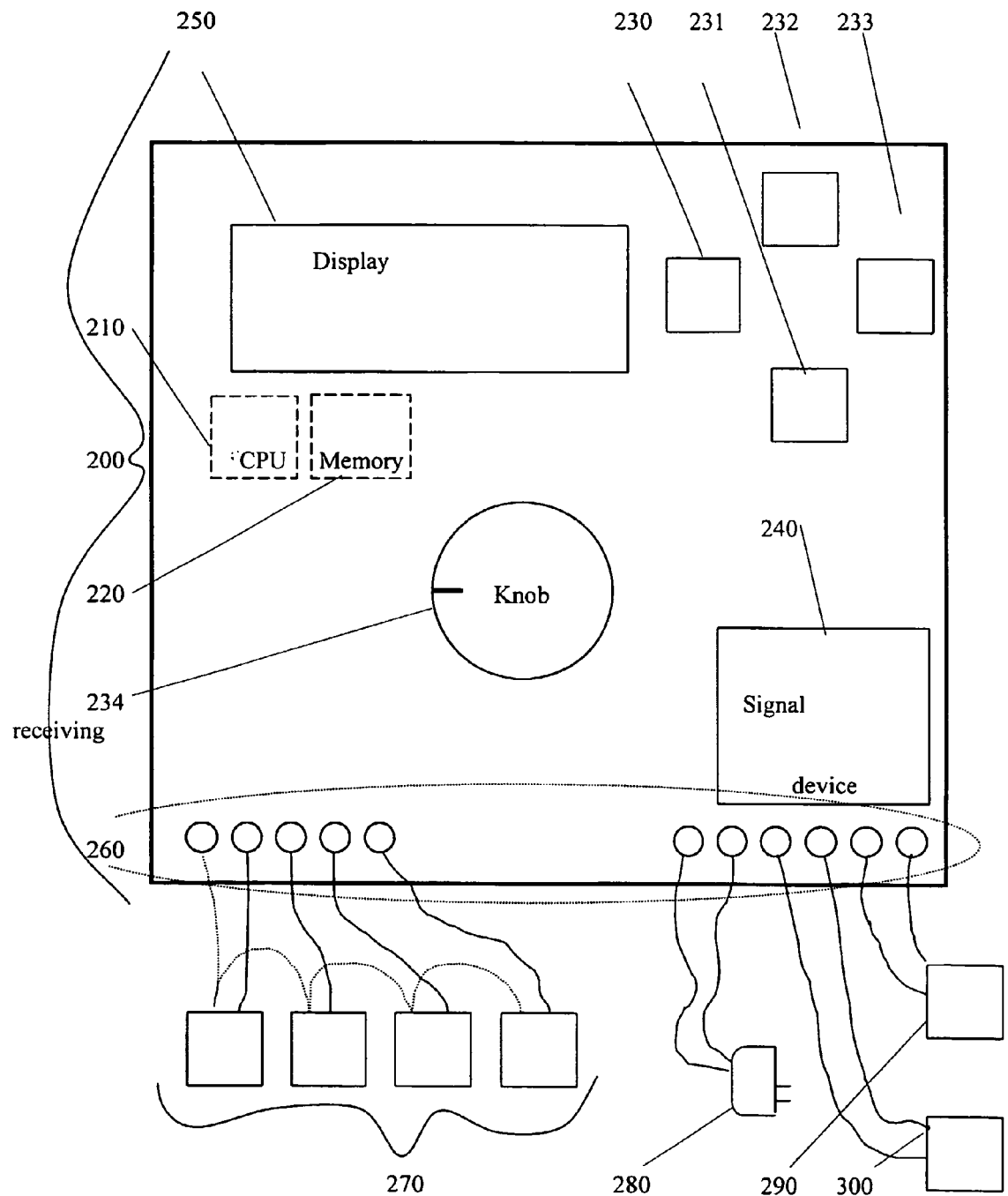
FIG. 5 is a schematic of an irrigation controller.

The regression model is preferably programmed into the central processing unit 210 or memory 220 of the irrigation controller using a suitable assembler language or microcode (See FIG. 5). The value or values applied against the regression model are preferably obtained from one or more local sensors, steps 311 through 315 (see FIG. 6). The microprocessor based central processing unit may have conventional interface hardware for receiving and interpreting of data or signals from such sensors.

Figure 3:
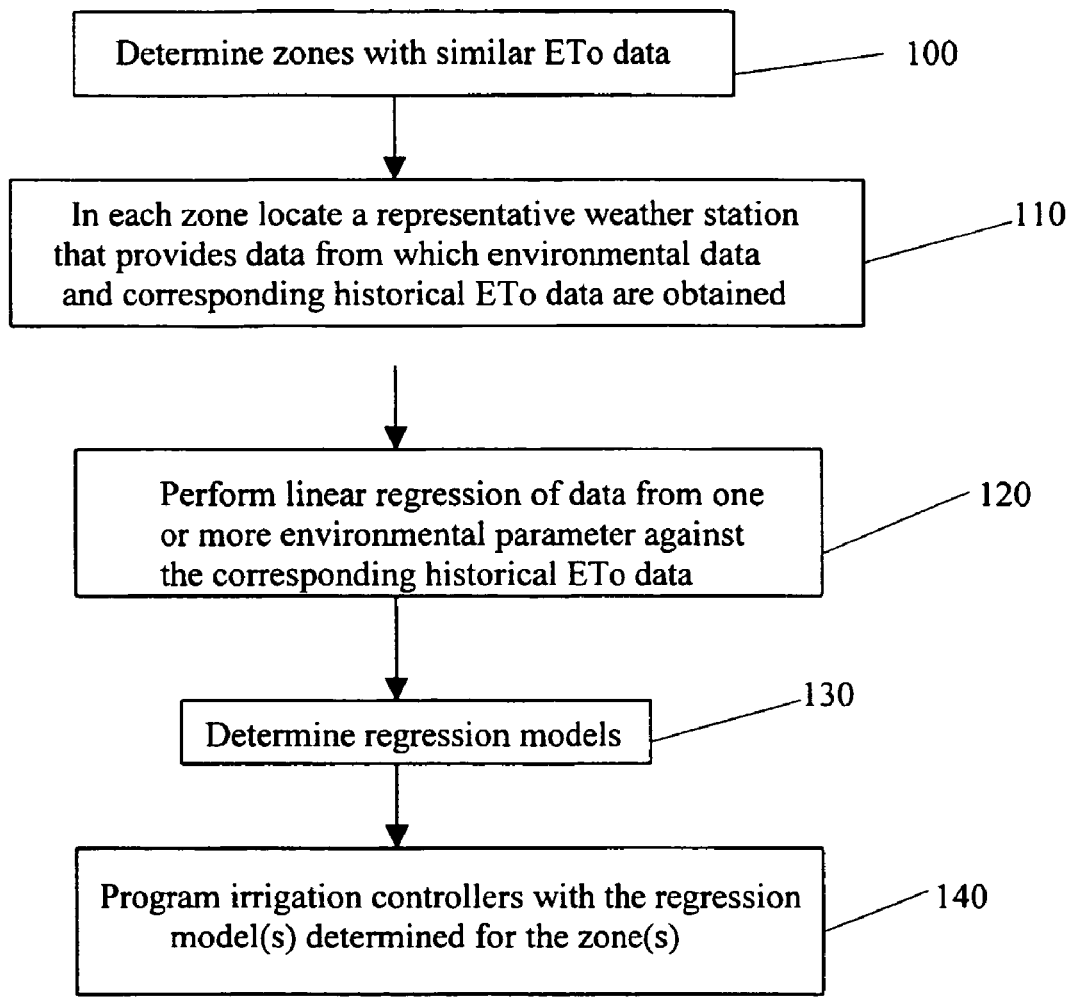
FIG. 3 is a flow chart of the steps in the determination of a regression model which would be programmed in irrigation controllers.

In FIG. 3 the initial step in a preferred determination of a regression model is to select zones with similar evapotranspiration characteristics, step 100. A representative weather station, which provides ETo values, is selected in the zone, step 110. Preferably, monthly linear regression is performed of one or more historical factor(s) against the historical ETo values, step 120. Alternatively, it is contemplated that bi-monthly, quarterly, or other time periods may be used in performing the linear regression of historical temperature values against the historical ETo values. It is also contemplated that multiple regression or other regression analysis may be used in the determination of the regression relationships between historical temperature values and historical ETo values.

Monthly regression models are determined from these regression relationships, step 130. All irrigation controllers located in a specific zone are then programmed with the regression models determined for that zone, step 140.

Figure 4:
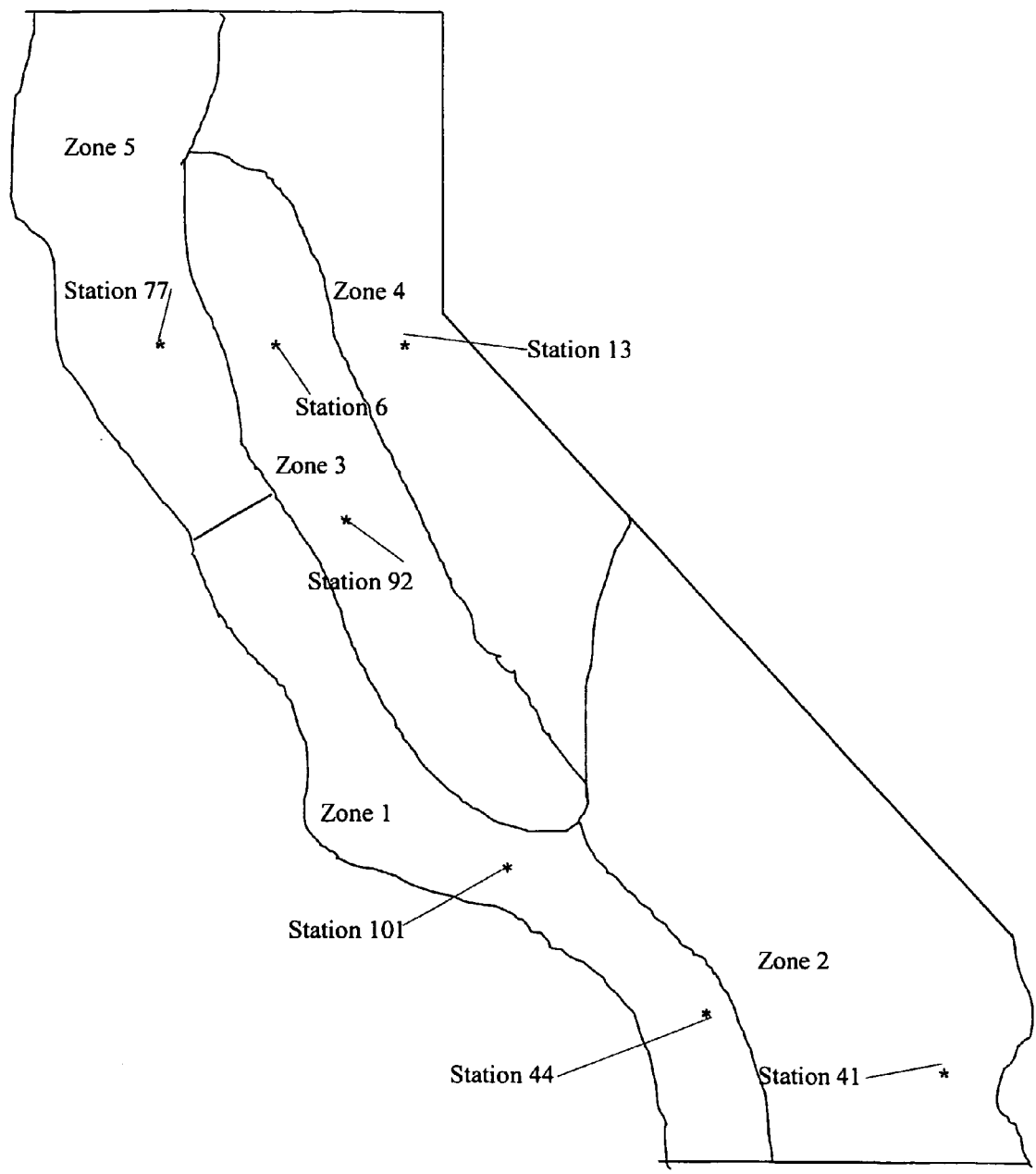
FIG. 4 is a map depicting how California might be divided into zones with similar evapotranspiration characteristics, and the location of a representative weather station within each zone.

FIG. 4 is a map depicting how California might be divided into zones with similar evapotranspiration characteristics, and the location of a representative weather station within each zone.

FIG. 5 is a schematic of an irrigation controller programmed with a regression model that, along with other inputs and/or adjustments, would determine the run times for the various stations controlled by the irrigation controller. A preferred embodiment of an irrigation controller 200 generally includes a microprocessor based central processing unit 210, an on-board memory 220, some manual input devices 230 through 234 (buttons and or knobs), a signal receiving device 240, a display screen 250, a plurality of electrical connectors 260 for connecting with solenoids 270, and a power supply 280. Each of these components by itself is well known in the electronic industry, with the exception of the programming of the microprocessor in accordance with the functionality set forth herein.

Figure 6:
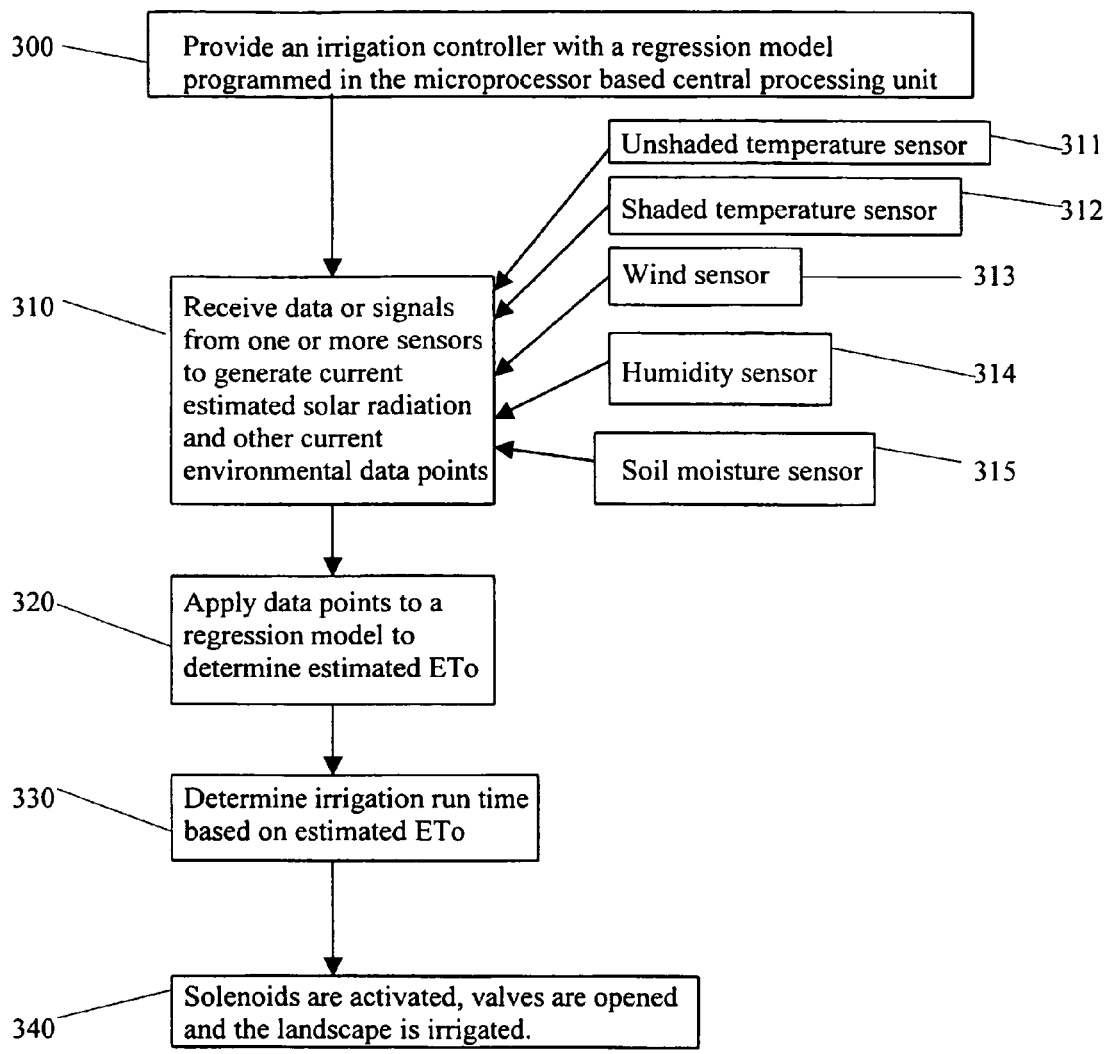
FIG. 6 is a flow chart of an irrigation system according to the present invention.

FIG. 6 is a flow chart of an irrigation system according to the present invention. It starts with the controller 300 such as that described in the immediately preceding paragraph. Step 310 is the receiving of measurements of one or more current environmental factor(s) 311–315. These measurements are applied to the regression model and estimated ETo is determined 320. The estimated ETo is used to determine irrigation run times 330. Then the solenoids are activated, valves are opened and the landscape is irrigated 340.

Thus, specific embodiments and applications of irrigation controllers using regression models have been disclosed. It should be apparent, however, to those skilled in the art that many more modifications besides those described are possible without departing from the inventive concepts herein. The inventive subject matter, therefore, is not to be restricted except in the spirit of the appended claims.

What is claimed is:

1. An irrigation controller comprising:
   a microprocessor that receives temperature data, and at least partly derives an estimated solar radiation value from the difference between the temperature data collected from a non-shaded temperature sensor and the temperature data collected from a shaded temperature sensor; and
   a mechanism that uses the estimated solar radiation value to affect an irrigation schedule executed by the controller.

2. An irrigation system comprising an irrigation controller according to claim 1, a non-shaded temperature sensor, and a shaded temperature sensor.

3. An irrigation system comprising an irrigation controller according to claim 1, and a receiver that receives from a distal sensor, temperature signals from which the estimated solar radiation is partly derived.

4. The controller of claim 1, wherein the mechanism includes a central processing unit that utilizes a regression model that estimates an evapotranspiration rate using a data point related to the estimated solar radiation.

5. The controller of claim 4 further comprising a memory model that stores the repression model, wherein the regression model comprises a linear regression.

6. The controller of claim 4 further comprising a memory model that stores the regression model, wherein the regression model comprises a multiple regression.

7. The controller of claim 4 further comprising a memory model that stores the regression model, wherein the regression model is based at least in part upon a set of historical ETo values, and a set of corresponding historical values for solar radiation.

8. The controller of claim 7, wherein the set of historical ETo values spans a time period of at least two days.

9. The controller of claim 7, wherein the regression model is further based upon a second set of historical values for a second environmental factor other than estimated solar radiation.

10. The controller of claim 9, wherein the second environmental factor is temperature.

11. The controller of claim 9, wherein the second environmental factor is humidity.

12. The controller of claim 9, wherein the second environmental factor is wind speed 13. The controller of claim 9, wherein the second environmental factor is soil moisture.

14. The controller of claim 9, wherein the second environmental factor is selected from the group consisting of temperature, humidity, wind speed, and soil moisture.

15. An irrigation system comprising an irrigation controller according to claim 9, and a local sensor that provides a signal corresponding to a value for the second environmental factor.

16. An irrigation system comprising an irrigation controller according to claim 9, and a receiver that receives from a distal source a signal corresponding to a value for the second environmental factor.

\* \* \* \* \*